Nov. 5, 1940.    K. SCHWARZ    2,220,461
SOUND RECORDING
Filed Dec. 29, 1937

Inventor
Karl Schwarz
By
Attorney

Patented Nov. 5, 1940

2,220,461

UNITED STATES PATENT OFFICE 2,220,461

SOUND RECORDING

Karl Schwarz, Berlin, Germany, assignor to Klangfilm G. m. b. H., Berlin, Germany, a corporation of Germany Application December 29, 1937, Serial No. 182,173
In Germany March 15, 1937

1 Claim. (Cl. 88—24)

This invention relates to the photographic recording of light impulses such as those of audio frequency, and has for its principal object the provision of an improved apparatus and method of operation whereby blurring of such a record due to stray light is minimized or avoided.

It is known that photographic recording with ultra-violet light, for example, has certain advantages. It is also found that such recording has certain disadvantages due to the strong stray light frequently encountered in the use of an ultra-violet camera. According to the invention, there is provided an improved arrangement by which stray light is prevented from reaching the film. In this way, it is ensured that the sound record does not become blurred or hazy. More particularly there has been provided a series of diaphragms which keep the stray light from the object lens, but allow the useful light to pass. These diaphragms may be located at any suitable point in the optical system.

According to one modification of the invention, a diaphragm of a definite shape and size is arranged in front of the object lens which images the light slit on the film. With this arrangement, the swinging galvanometer mirror is imaged on the object lens. In this case, it is advisable to give the diaphragm the shape of this image. With rectangular mirrors, the diaphragm has also a similar rectangular hole. With such a diaphragm, the stray light which is reflected by the surroundings of the swinging mirror arrives at the object lens and the film through the slit but only those rays that are reflected by the swinging mirror itself can reach the film. The invention is particularly advantageous in the case of ultra-violet light recording because such light is particularly susceptible to reflection from areas other than that of the galvanometer mirror. If the diaphragm in front of the object lens were omitted, this reflected light would get into the object lens and, consequently, on the film, thus making the record blurred.

The invention will be better understood from the following description when considered in connection with the accompanying drawing and its scope is indicated by the appended claim.

Referring to the drawing

Figure 1:
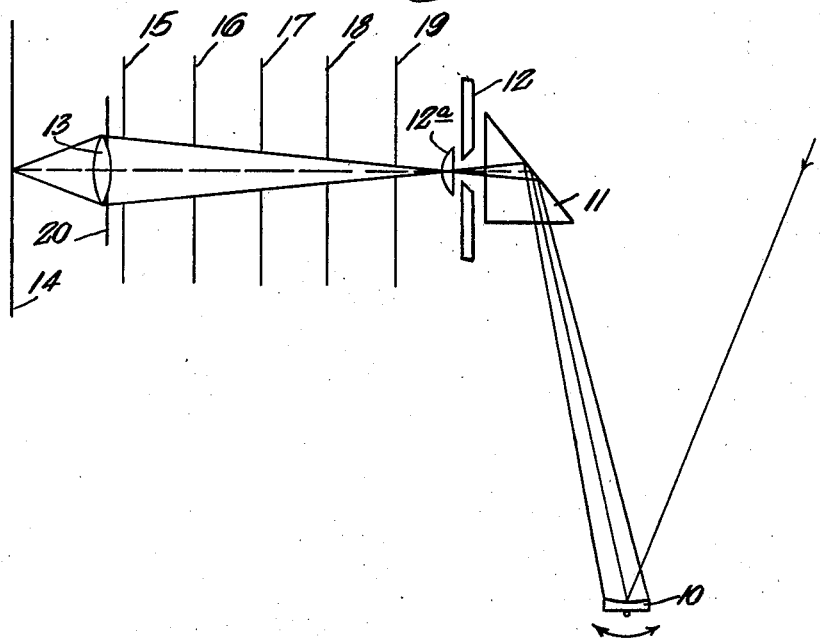
Figure 1 illustrates a preferred embodiment of the invention.
Figure 2:
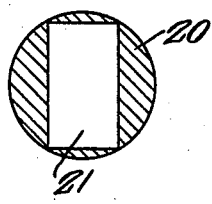
Figure 2 is an explanatory diagram relating to the operation of the arrangement of Fig. 1.

In the arrangement of Fig. 1, the light beam is applied in the direction of the arrow to the swinging concave galvanometer mirror 10 and is reflected thence to the slit 12 by a prism 11. A lens 12a images the mirror 10 on the object lens 13 which images the slit 12 on film 14. A series of diaphragms 15, 16, 17, 18 and 19 are arranged between object lens 13 and slot 12. These diaphragms transmit only that part of the light which is absolutely required for the recording. It will be observed that the openings of the diaphragms become smaller from diaphragm 15 to diaphragm 19. This reduction in the size of the openings depends on the aperture of the object lens and on the slot dimensions. It will be apparent that the stray light originating anywhere in the camera is kept away from object lens 13 by the series of diaphragms 15—19. In addition, with the arrangement of Fig. 1, a diaphragm 20 which is separately illustrated in Fig. 2 may also be associated with object lens 13. This diaphragm has a rectangular opening which is designed in such a size that exactly the rectangular mirror 10 which is designed in this case as a concave mirror is imaged in the rectangular opening by lens 12a. In this way, any light which is reflected eventually outside of mirror 10, either by the holding bands of the mirror or by the enamel layer which is also reflected somewhat with ultra-violet light, is kept away from the object lens. Consequently, a record which is free from stray light is obtained. In this way, the record is rendered more sharp and blurring of its edges is avoided.

I claim as my invention:

A light impulse recorder including means providing a light slit, a reflector vibratable in accordance with said impulses for applying said light to said slit, an objective lens for imaging said slit on a record surface, means for producing an image of said reflector at said lens, diaphragm means adjacent to said lens for confining the illuminated area of said lens to said reflector image, and means including a plurality of coaxial variably apertured diaphragms for excluding stray light from said lens.

KARL SCHWARZ.